(12) United States Patent
Chendake

(10) Patent No.: US 11,728,752 B2
(45) Date of Patent: Aug. 15, 2023

(54) LOAD ADAPTIVE FLUX WEAKENING OF PERMANENT MAGNET SYNCHRONOUS MOTOR OPERATING IN VOLTAGE CONTROL MODE

(71) Applicant: Infineon Technologies Austria AG, Villach (AT)

(72) Inventor: Vedant Sadashiv Chendake, Lengkong Tujoh (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/543,854

(22) Filed: Dec. 7, 2021

(65) Prior Publication Data

US 2023/0179132 A1    Jun. 8, 2023

(51) Int. Cl.
*H02P 21/14*  (2016.01)
*H02P 21/00*  (2016.01)
*H02P 21/18*  (2016.01)
*H02P 21/22*  (2016.01)

(52) U.S. Cl.
CPC .......... *H02P 21/18* (2016.02); *H02P 21/0089* (2013.01); *H02P 21/141* (2013.01); *H02P 21/22* (2016.02); *H02P 2207/055* (2013.01)

(58) Field of Classification Search
CPC .... H02P 21/0089; H02P 23/009; H02P 21/22; H02P 21/0003; H02P 21/141; H02P 21/18; H02P 27/08; H02P 2203/09; H02P 25/145; G01R 19/16538
See application file for complete search history.

(56) References Cited

U.S. PATENT DOCUMENTS

| | | | |
|---|---|---|---|
| 6,965,212 B1* | 11/2005 | Wang | H02P 21/06 318/700 |
| 10,673,365 B2* | 6/2020 | Yu | H02P 6/10 |
| 2006/0022626 A1* | 2/2006 | Kobayashi | B62D 5/046 318/432 |
| 2010/0231149 A1* | 9/2010 | Gallegos-Lopez | H02P 21/06 318/400.02 |
| 2014/0210387 A1* | 7/2014 | Zhao | H02P 21/18 318/400.02 |

(Continued)

OTHER PUBLICATIONS

Extended European Search Report for Application No. EP22211869.7, dated Apr. 6, 2023, 8 pages.

*Primary Examiner* — Bickey Dhakal
(74) *Attorney, Agent, or Firm* — Harrity & Harrity, LLP

(57) ABSTRACT

A method of driving a permanent magnet synchronous motor (PMSM) with Field Oriented Control (FOC) includes: generating, by a current controller, control signals for driving motor currents of the PMSM; measuring, by the current controller, current information of the PMSM, including a direct-axis motor current and a quadrature-axis motor current; generating, by a direct-axis current controller, a direct-axis error value based on a difference between a flux weakening reference current and the direct-axis motor current; regulating, by the direct-axis current controller, a direct-axis motor voltage, including generating the direct-axis motor voltage based on the direct-axis error value; and generating and dynamically adapting, by a flux weakening controller, the flux weakening reference current based on changes to the motor load.

22 Claims, 3 Drawing Sheets

(56) References Cited

U.S. PATENT DOCUMENTS

2014/0312812 A1 10/2014 Sasaki et al.
2016/0276962 A1* 9/2016 Khalil ................. B60L 15/2045
2018/0131305 A1* 5/2018 Wang .................. H02P 21/0021

* cited by examiner

LOAD ADAPTIVE FLUX WEAKENING OF PERMANENT MAGNET SYNCHRONOUS MOTOR OPERATING IN VOLTAGE CONTROL MODE

BACKGROUND

Motor control algorithms are used by a motor controller for controlling a Permanent Magnet Synchronous Motor (PMSM). Flux weakening is a method to achieve higher motor speed beyond the base speed by weakening the flux linkage with the permanent magnet. In Field Oriented Control (FOC), flux weakening is achieved by setting a negative flux reference current (e.g., −ref Id). The magnitude of negative flux reference current controls how much flux weakening is applied. Flux weakening requires speed control which generates the necessary inputs for the flux weakening algorithm to decide the optimal negative flux reference current. In real-time applications, there is also a need to consider the flux weakening to be activated only when the motor is not operating at higher load conditions. Activating flux weakening when the motor is operating at a higher load will further reduce the torque and the motor may stop. Conventional flux weakening algorithms do not adapt according to the motor loading in real-time while the motor is running which limits flux weakening usage in many applications where a dynamic load variation occurs.

Moreover, conventional flux weakening algorithms rely on the speed controller/torque controller output to decide the optimal negative flux reference current. In many applications, speed/torque control is not suitable due to application requirements. In such applications, voltage control is preferred but is not currently used in combination with conventional flux weakening algorithms. Voltage control has unique capabilities such as fast response and natural driving, which makes it the most preferred controlling method in applications such as power tools, electric vehicles, etc. To give an example, in a power drill application, conventional flux weakening algorithms will not be able to handle the dynamic load variations and high-speed operations at the same time.

Conventional flux weakening algorithms have the following shortcomings: control logic is complex, they do not support dynamic adjustment to the flux weakening based upon variations in the load and variations in the supply voltage, the require speed/torque control to generate necessary inputs for the flux weakening algorithm, a complex control algorithm requires higher CPU bandwidth which makes it unsuitable for the low-end microcontrollers, flux weakening PI controller fine-tuning is required and it becomes more complex when higher dynamics are required, and some conventional flux weakening algorithms also require a Look-Up Table (LUT) to determine the flux weakening reference current which results in additional code size and are nonadaptable to dynamic load variations.

Therefore, it may be desirable to develop flux weakening control logic that is capable of adapting the amount of flux weakening based on real-time load variations with voltage control to achieve high-speed operations.

SUMMARY

One or more embodiments provide a motor drive system configured to drive a permanent magnet synchronous motor (PMSM) with Field Oriented Control (FOC), the motor drive system including: a current controller configured to generate control signals for driving motor currents of the PMSM according to a motor load, wherein the current controller is configured to receive or measure current information of the PMSM, including a direct-axis motor current and a quadrature-axis motor current. The current controller includes a direct-axis current controller configured to receive a flux weakening reference current and the direct-axis motor current to generate a direct-axis error value based on a difference between the flux weakening reference current and the direct-axis motor current. The direct-axis current controller is configured to regulate a direct-axis motor voltage, wherein the direct-axis current controller generates the direct-axis motor voltage based on the direct-axis error value. The current controller further includes a flux weakening controller configured to generate and dynamically adapt the flux weakening reference current based on changes to the motor load.

One or more embodiments provide a method of driving a permanent magnet synchronous motor (PMSM) with Field Oriented Control (FOC). The method includes: generating, by a current controller, control signals for driving motor currents of the PMSM; measuring, by the current controller, current information of the PMSM, including a direct-axis motor current and a quadrature-axis motor current; generating, by a direct-axis current controller, a direct-axis error value based on a difference between a flux weakening reference current and the direct-axis motor current; regulating, by the direct-axis current controller, a direct-axis motor voltage, including generating the direct-axis motor voltage based on the direct-axis error value; and generating and dynamically adapting, by a flux weakening controller, the flux weakening reference current based on changes to the motor load.

BRIEF DESCRIPTION OF THE DRAWINGS

Embodiments are described herein making reference to the appended drawings.

DETAILED DESCRIPTION

Figure 1A:
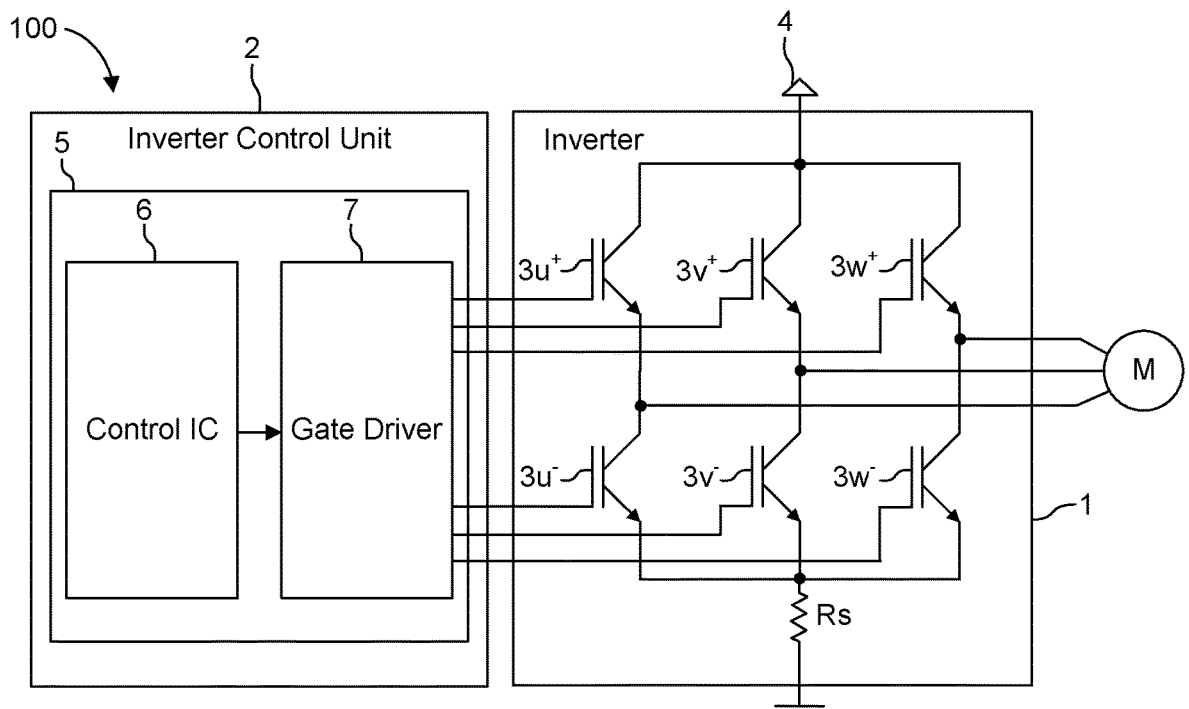
FIG. 1A is a schematic block diagram illustrating a motor control actuator of a power semiconductor device according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state. A control signal may by a voltage signal or a current signal having a controlled value.

A power transistor is a power semiconductor device that may be used to drive a load current. For example, an IGBT is turned "ON" or "OFF" by activating and deactivating its gate terminal. Applying a positive input voltage signal across the gate and the emitter will keep the device in its "ON" state, while making the input gate signal zero or slightly negative will cause it to turn "OFF". There is a turn-on process and a turn-off process for switching the power transistor on and off. During the turn-on process, a gate driver integrated circuit (IC) may be used to provide (source) a gate current (i.e., an on current) to the gate of the power transistor in order to charge the gate to a sufficient voltage to turn on the device. In contrast, during the turn-off process, the gate driver IC is used to draw (sink) a gate current (i.e., an off current) from the gate of the power transistor in order to discharge the gate sufficiently to turn off the device. A current pulse may be output from the gate driver IC as the control signal according to a pulse width modulation (PWM) scheme. Thus, the control signal may be switched between an ON current level and an OFF current level during a PWM cycle for controlling a power transistor. This in turn charges and discharges the gate voltage to turn on and off the power transistor, respectively.

In particular, the gate of a power transistor is a capacitive load, and the turn ON current (i.e., gate source current) and the turn OFF current (i.e., gate sink current) are specified as the initial current when a switching event is initiated. During a turn OFF event, after some small amount of time (small compared to the PWM period), the gate current decreases and reaches a zero value when the gate reaches 0V. During a turn ON event, after some small amount of time (small compared to the PWM period), the gate current decreases and reaches a zero value when the gate reaches 15V.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to each other for driving a phase load. However, multi-phase inverters are not limited to three phases, and may include two phases or more than three phases, with an inverter leg for each phase.

FIG. 1A is a schematic block diagram illustrating a motor control actuator 100 of a power semiconductor device according to one or more embodiments. In particular, the motor control actuator 100 includes a power inverter 1 and an inverter control unit 2. The inverter control unit 2 behaves as a motor control unit and thus may also be referred to as a motor controller or a motor control IC. The motor control unit may be a monolithic IC or may be split into a microcontroller and a gate driver on two or more ICs.

The motor control actuator 100 is further coupled to a three-phase motor M, that includes three phases U, V, and W. The power inverter 1 is a three-phase voltage generator configured to provide three-phase power by supplying three phase voltages to drive the motor M. It will be further appreciated that the power inverter 1 and the inverter control unit 2 may be placed on a same circuit board, or on separate circuit boards.

Deviations in both magnitude and phase may cause a loss in power and torque in the motor M. Therefore, the motor control actuator 100 may be configured to monitor and control the magnitude and phase of the voltages supplied to the motor M in real-time to ensure the proper current balance is maintained based on a feedback control loop. Open loop motor control units also exist and may be implemented.

The power inverter 1 for a three-phase motor M includes a switching array of six transistor modules $3u+$, $3u-$, $3v+$, $3v-$, $3w+$, and $3w-$ (collectively referred to as transistor modules 3) arranged in complementary pairs. Each complementary pair constitutes one inverter leg that supplies a phase voltage to the three-phase motor M. Thus, each inverter leg includes an upper (high-side) transistor module 3 and a lower (low-side) transistor module 3. Each transistor module includes one power transistor and may also include a freewheeling diode (not illustrated). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery or a diode bridge rectifier) and to the inverter control unit 2.

In this example, the inverter control unit 2 includes a motor control circuit and the gate driver circuit for controlling the switching array. In some examples, the inverter control unit 2 may be monolithic in which the motor control circuit and gate driver circuit are integrated onto a single die. In other examples, the motor control circuit and gate driver circuit may be partitioned as separate ICs. A "monolithic" gate driver is a gate driver on a single silicon chip and may be further made with specific high voltage (HV) technology. Furthermore, the gate driver IC may be integrated on the power inverter 1.

The motor controller performs the motor control function of the motor control actuator 100 in real-time and transmits PWM control signals to a gate driver. Motor control function can include either controlling a permanent magnet motor or an induction motor and can be configured as a sensor-based control or a sensorless control not requiring the rotor position sensing, as is the case with a sensor-based control that uses Hall sensors and/or an encoder device to sense the rotor position. Alternatively, the motor control function may include a combination of both sensor-based control (e.g., used at lower rotor speeds) and sensorless control (e.g., used at higher rotor speeds).

For example, the inverter control unit 2 includes a controller and driver unit 5 that includes a microcontroller unit (MCU) 6 as the motor controller and a gate driver 7 for generating driver signals for controlling the transistors of each transistor module 3. Thus, load current paths U, V, and W may be controlled by the controller and driver unit 5 by means of controlling the control electrodes (i.e., gate electrodes) of the transistors 3. For example, upon receiving a PWM control signal from the microcontroller, the gate driver IC may set a corresponding transistor in one of a conducting state (i.e., on-state) or a blocking state (i.e., off-state).

The gate driver IC may be configured to receive instructions, including the power transistor control signals, from the microcontroller, and turn on or turn off respective transistors 3 in accordance with the received instructions and control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

The inverter control unit 2 or the controller and driver unit 5 itself may include a PWM controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the microcontroller 6 of the controller and driver unit 5 may use a motor control algorithm, such as a Field Oriented Control (FOC) algorithm, for providing current control in real-time for each phase current output to a multi-phase load, such a multi-phase motor. Thus, the field-oriented control loop may be referred to as a current control loop. Flux weakening may further be controlled by adding a flux weakening control loop on top of FOC control. Thus, FOC (i.e., the current control loop) may be considered as an inner control loop and the flux weakening control loop may be considered as an outer control loop.

In some cases, motor position may be controlled using an additional control loop (e.g., a position control loop).

For example, during FOC, a motor phase current should be measured such that an exact rotor position can be determined in real-time. To implement the determination of the motor phase current, the microcontroller 6 may employ an algorithm (e.g., space vector modulation (SVM), also referred as space vector pulse width modulation (SVPWM)) that uses single-shunt current sensing.

Furthermore, the switches 3 (i.e., transistors) of the power inverter 1 are controlled so that at no time are both switches in the same inverter leg turned on or else the DC supply would be shorted. This requirement may be met by the operation of the switches 3 within an inverter leg according to the motor control algorithm.

Figure 1B:
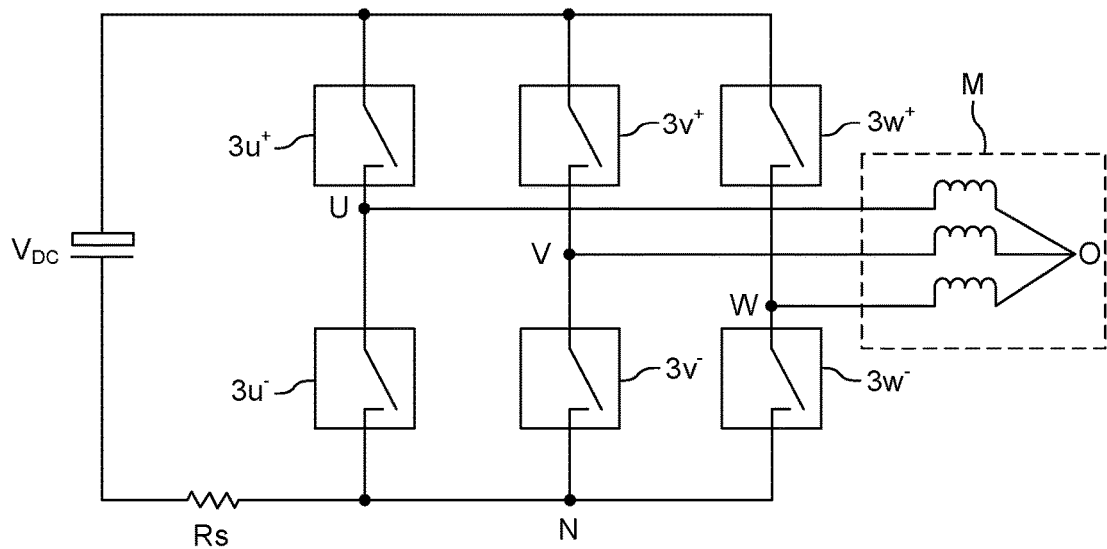
FIG. 1B is a schematic diagram illustrating a power inverter utilizing single-shunt current sensing according to one or more embodiments.

FIG. 1B is a schematic diagram illustrating a power inverter 1 utilizing single-shunt current sensing according to one or more embodiments. In particular, the power inverter 1 includes a shunt resistor Rs placed on the negative DC link of the power inverter 1. The transistors $3_{u+}$, $3_{u-}$, $3_{w+}$, and $3_{w-}$ are represented as switches and the motor M is shown with a winding for each of its phases. Here, UO represents the line to neutral voltage from bridge middle point U to motor neutral point O; UN represents the U bridge voltage from bridge middle point U to the negative bus supply rail N; UV represents the line-to-line voltage from U phase to V phase; VW represents the line-to-line voltage from V phase to W phase; and WV represents the line-to-line voltage from W phase to V phase.

The microcontroller 6 in FIG. 1A may receive samples of the current taken from the shunt resistor Rs and then use an algorithm (i.e., software) to re-construct the three-phase current in real-time. For example, SVPWM is a vector control-based algorithm that requires the sensing of the three motor phase currents. By using the single-shunt resistor Rs, DC-link current pulses are sampled at exactly timed intervals. A voltage drop on the shunt resistor Rs may be amplified by an operational amplifier inside inverter control unit 2 and shifted up, for example, by 1.65V. The resultant voltage may be converted by an ADC inside inverter control unit 2. Based on the actual combination of switches, the three-phase currents Iu, Iv, and Iw of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero. It will also be appreciated that each of the load current paths U, V, and W may be coupled to a respective a shunt resistor that is used for measuring a respective one of the phase currents Iu, Iv, and Iw directly (i.e., without reconstruction).

SVPWM itself is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

In addition, it will be appreciated that other implementations other than a single-shunt resistor may be used for current sensing, as well as other motor control algorithms may be used to control the load, and that the embodiments described herein are not limited thereto.

Figure 2:
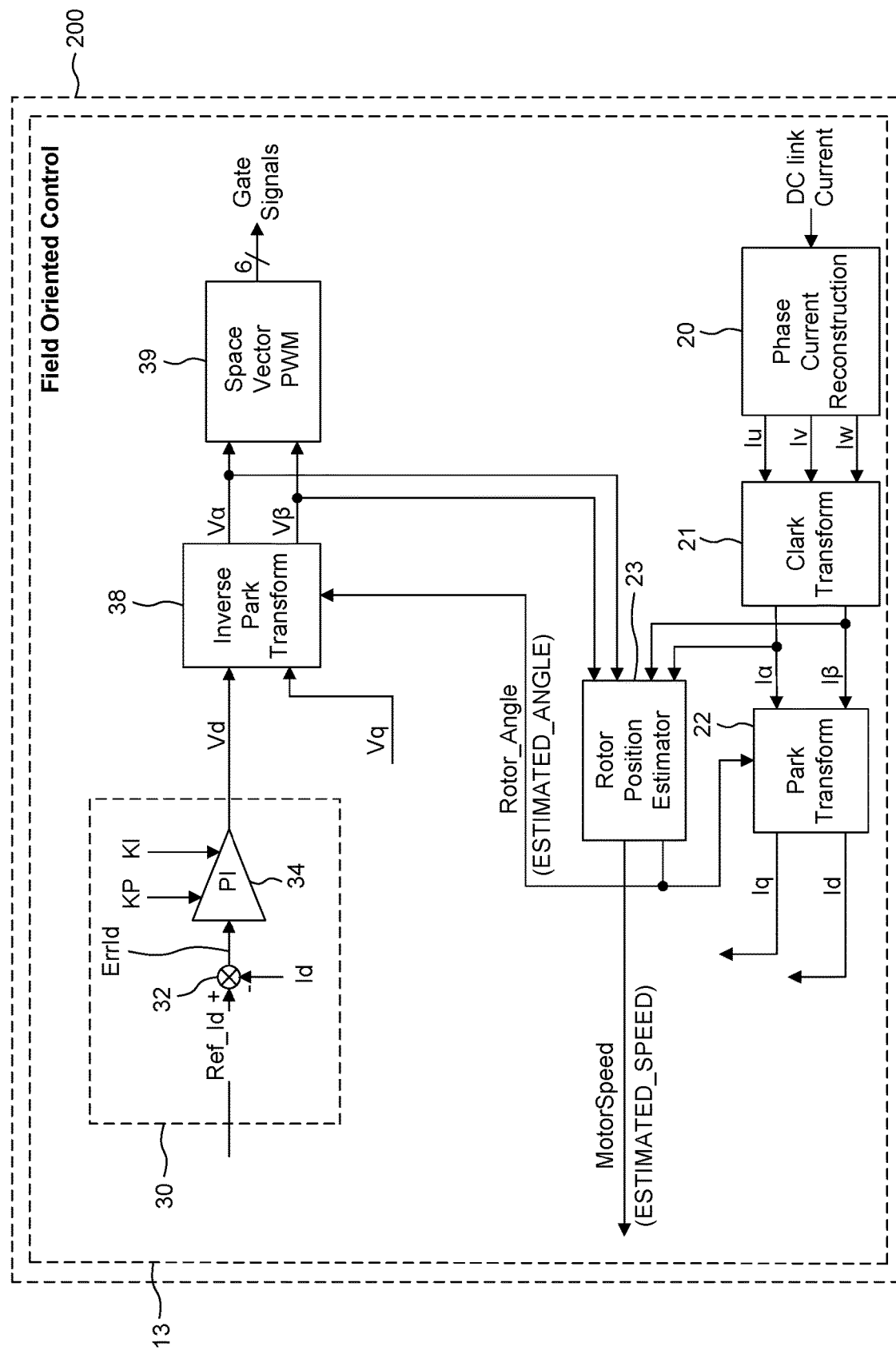
FIG. 2 illustrates a schematic block diagram of a Field Oriented Control (FOC) current control loop of a motor control algorithm implemented by a motor controller according to one or more embodiments.
Figure 3:
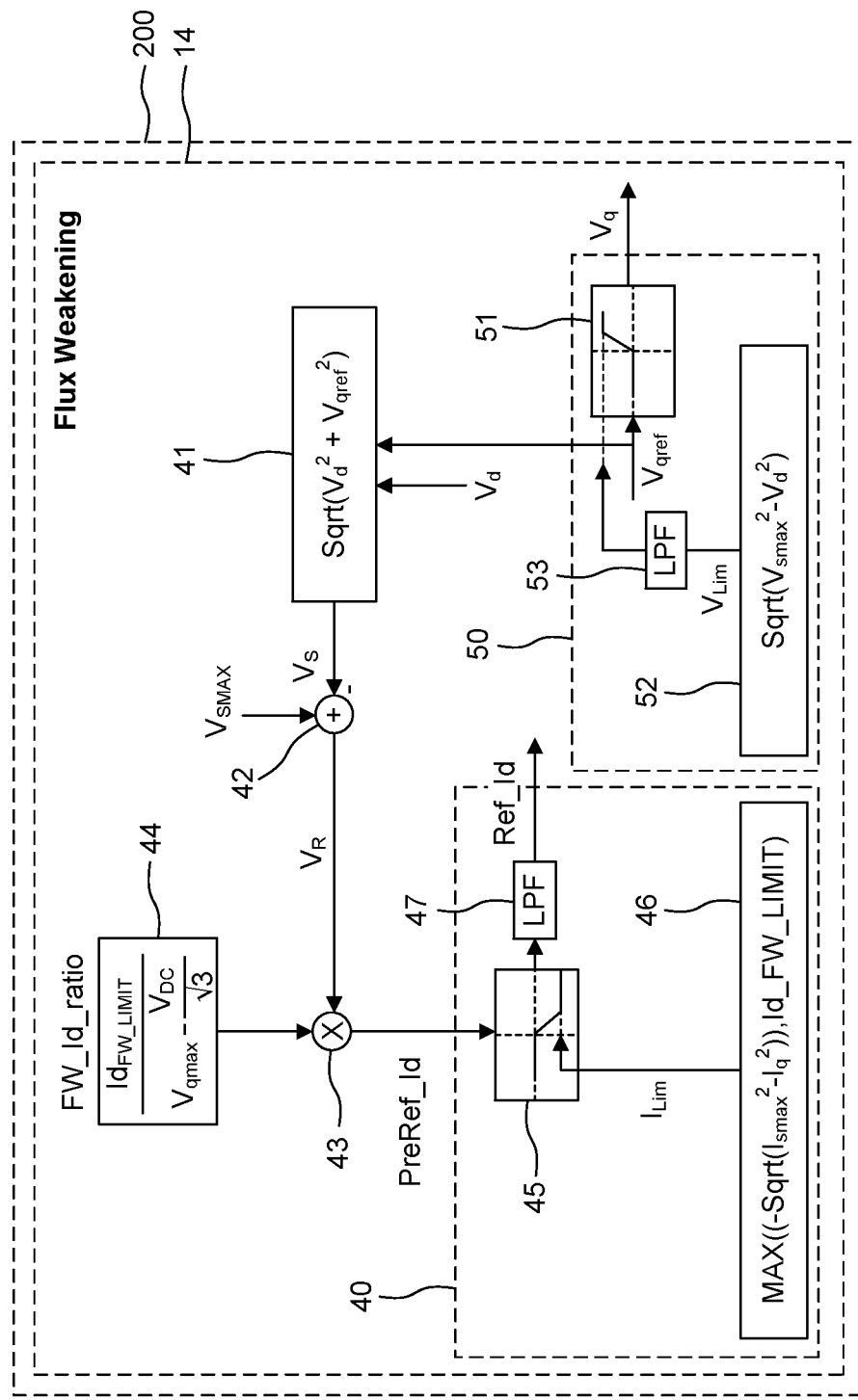
FIG. 3 illustrates a schematic diagram of a flux weakening control loop of the motor control algorithm implemented by a motor controller according to one or more embodiments.

FIGS. 2 and 3 illustrate, in combination, a schematic block diagram of a motor control algorithm 200 according to one or more embodiments. The motor control algorithm 200 may be referred to as a current controller comprising a plurality of control loops or sub-controllers. In particular, the motor control algorithm 200 is illustrated in two parts, FIGS. 2 and 3, that are coupled together by corresponding signal lines to form the full motor control algorithm 200. Specifically, FIG. 2 illustrates a schematic block diagram of an FOC current control loop 13 and FIG. 3 illustrates a schematic block diagram of a flux weakening control loop 14. Both loops may comprise and/or share one or more processors. For example, calculation units 44, 46, 52 may be implemented in one or more processors that may be further shared with components of the FOC current control loop 13.

The motor control algorithm 200 may be implemented as firmware programmed into the motor controller 6 or by a combination of firmware and circuit components. The motor controller 6 itself may include one or more controllers, one or more processing circuits, and/or one or more signal processors that is/are configured to implement the motor control algorithm 200.

In particular, the motor control algorithm 200 includes an FOC current control loop 13 and a flux weakening control loop 14 that are implemented by motor controller 6 shown in FIG. 1A. Thus, the motor controller 6 includes a speed controller that implements outer loop control and a current controller that implements inner loop control. The FOC current control loop 13 and the flux weakening control loop 14 form a current controller system and may represent controllers of the overall current controller system. Thus, the flux weakening control loop 14 may be referred to as a flux weakening controller of the current controller system.

As used herein, Vq and Vd represent the stator quadrature (Q) and direct (D) axis voltages of the motor in a DQ coordinate system, respectively. That is, Vq is the quadrature-axis motor voltage component on the Q-axis of a DQ coordinate system and Vd is the direct-axis motor voltage component on the D-axis of the DQ coordinate system. Similarly, Iq and Id represent the stator Q and D axis currents of the motor in a DQ coordinate system, respectively. That is, Iq is the quadrature-axis motor current component on the Q-axis of the DQ coordinate system and Id is the direct-axis motor current component on the D-axis of the DQ coordinate system.

Furthermore, a Proportional-Integral (PI) controller receives a proportional gain KP and an integral gain KI and generates an output according to equations, Eq. 1 and Eq. 2:

$$\text{PI output} = KP\Delta + KI\int \Delta dt, \quad \text{Eq. 1}$$

where $\Delta$ is the error or deviation of an actual measured value (PV) from a setpoint (SP).

$$\Delta = SP - PV \quad \text{Eq. 2}$$

FOC software supports to drive both types of Permanent Magnet Synchronous Motors (PMSM), i.e., constant air-gap surface mount magnet motor and interior mount magnet motors with variable-reluctance. A sensorless FOC algorithm structure is illustrated in FIGS. 2 and 3 and follows a cascaded control structure, with an outer flux weakening control loop 14 and an inner current control loop 13 that each play a role at varying the motor windings voltages to drive the motor at a target power or a target speed.

A forward vector rotation unit 38 applies a forward vector rotation to the current loop output voltages Vd and Vq and transforms the current loop output voltages Vd and Vq via an inverse Park transform into two phase AC voltage components V$\alpha$ and V$\beta$ based on the rotor angle calculated by the flux estimator and phase-locked loop (PLL) unit 23. A space vector pulse width modulator 39 receives the two phase AC voltage components V$\alpha$ and V$\beta$ and generates the inverter switching signals (i.e., six paths of PWM control signals output from motor controller 6) based on the V$\alpha$ and V$\beta$ voltage inputs and SVPWM. The gate driver 7 then turns on/off the respective power transistors 3 based on the PWM control signals.

The current loops of the FOC current control loop 13 calculate the inverter voltages to drive the motor currents needed to generate the desired torque. The phase current reconstruction circuit 20 uses single shunt reconstruction to reconstruct the each of the phase currents Iu, Iv, and Iw for each respective phase U, V, and W. In particular, phase current reconstruction circuit 20 measures the DC link current in the shunt resistor during the active vectors of the PWM cycle. In each PWM cycle, there are two different active vectors and the DC link current in each active vector represents current on one motor phase. The calculation of the third phase current value is possible because at balanced condition the sum of all the three winding currents is zero.

The Field-oriented control (FOC) uses the Clarke transform at Clarke transformation unit 21 to apply an alpha-beta transformation on the three-phase currents to derive an alpha current I$\alpha$ and a beta current I$\beta$. The FOC further uses a vector rotation (i.e., a cordic rotation) at vector rotation unit 22 to transform the motor winding currents using alpha and beta currents I$\alpha$ and I$\beta$ via a Park transform into two quasi DC current components, including an Id current component that reinforces or weakens the rotor field and an Iq current component that generates motor torque. Thus, the Id current component may be referred to as the flux current and the Iq current component may be referred to as the torque current.

The Iq current component increases with increased load and higher torque and decreases with decreased load and lower torque. It is also noted that the direct-axis motor voltage Vd is correction voltage generated by the flux (Id) PI current controller to maintain Id current to the reference Id current.

A rotor magnet position estimator includes a rotor position estimator 23. The rotor magnet position estimator 23 is configured to estimate the rotor angle and the motor speed based on the alpha and beta currents I$\alpha$ and I$\beta$) received from the Clarke transformation unit 21 and the two phase AC voltage components V$\alpha$ and V$\beta$ received from the forward vector rotation unit 38.

As one non-limiting example, the rotor position estimator 23 may include a flux estimator and a flux PLL that are configured to detect the rotor position and measure the motor speed of a running motor. Flux is calculated based on feedback currents (i.e., using alpha and beta currents I$\alpha$ and I$\beta$) received from the Clarke transformation unit 21, estimated voltages V$\alpha$ and V$\beta$ (based on DC bus feedback voltage and a modulation index) received from the forward vector rotation unit 38, and motor parameters (inductance and resistance). The output of the flux estimator represents rotor magnet fluxes in Alpha-Beta (stationary orthogonal frame, u-phase aligned with Alpha) two-phase quantities. The rotor position estimator 23 can estimate the flux angle (i.e., estimated rotor angle) and motor speed from the rotor magnet flux vector in Alpha-Beta components. The motor speed can be derived from the rotor frequency according to the number of rotor poles. It will be appreciated that other types of rotor position estimators may be used to calculate rotor position and motor speed and the disclosed embodiments are not limited to any particular type of rotor position estimator.

Flux weakening is a method to achieve higher motor speed beyond the base speed by weakening the flux linkage with the permanent magnet. In FOC, flux weakening is achieved by setting a flux weakening reference current (e.g., Ref_Id) to a negative value. Flux weakening is disabled or turned off when the flux weakening reference current is zero. The magnitude of flux reference current controls how much flux weakening is applied. The more negative the flux weakening reference current Ref_Id, the greater amount of flux weakening is applied thereby producing higher motor speeds.

The load adaptive flux weakening control algorithm of the embodiments makes usage of the information from the FOC current control loop 13 (i.e., form the FOC) to adapt the flux weakening reference current Ref_Id in real-time based on changes to the load. The flux weakening reference current Ref_Id tells the FOC how much flux weakening needs to be applied to achieve a target speed.

A direct-axis current controller 30 includes an error generator 33 and an Id PI controller 34. In general, the direct-axis current controller 30 is configured to receive a flux weakening reference current Ref_Id and the direct-axis motor current Id to generate a direct-axis error value ErrId based on a difference between the flux weakening reference current Ref_Id and the direct-axis motor current Id. The direct-axis current controller 30 is further configured to regulate the direct-axis motor voltage Vd by generating the direct-axis motor voltage Vd based on the direct-axis error value ErrId.

The error generator 32 may be a subtractor that receives the flux weakening reference current Ref_Id as a setpoint (SP) value and the Id current value from the vector rotation unit 22 as the actual measured value (PV) and generates error value ErrId as the difference therebetween. The Id PI controller 34 acts on error ErrId between the Ref_Id and Id to generate the direct-axis motor voltage Vd. Thus, the direct-axis motor voltage Vd is adapted base on direct-axis error value ErrId. The PI compensator gains KP and KI may be set depending on the motor and load characteristics to meet a target dynamic performance.

The load adaptive flux weakening control algorithm is implemented with voltage control and can be extended to speed/torque control with the existing FOC structure itself. FIG. 3 illustrates the load adaptive flux weakening control algorithm implemented by the current controller 200. The flux weakening control loop 14 generates the flux weakening reference current Ref_Id and dynamically adapts it based on changes to the load.

The flux weakening control loop 14 includes a feedback path comprising components 41, 42, 43, 45, and 47. The feedback path is configured to extract the direct-axis motor voltage Vd output from the Id PI controller 34 in order to for the flux weakening controller to calculate a pre-limited flux weakening reference current PreRef_Id based on the direct-axis motor voltage Vd and a reference quadrature-axis motor voltage Vqref. The reference quadrature-axis motor voltage Vqref is a configurable or programmable voltage value. For example, the reference quadrature-axis motor voltage Vqref may be preconfigured by a voltage source.

More particularly, the feedback path includes a calculation unit 41 that is configured to receive the direct-axis motor voltage Vd and the reference quadrature-axis motor voltage Vqref and calculate a feedback voltage Vs as a square root of $(Vd^2+Vqref^2)$. The calculation unit 41 may be embodied as a processor running the feedback voltage algorithm. The calculation unit 41 provides the feedback voltage Vs to a subtractor 42 that also receives a maximum available voltage Vsmax. The feedback voltage Vs is a demand voltage currently being demanded by the inverter 1 to drive the motor. The maximum available voltage Vsmax is an amount of voltage the inverter 1 can provide. Accordingly, the maximum available voltage Vsmax is configurable and typically predetermined (i.e., fixed). The subtractor 42 outputs a remaining available voltage Vr as a difference between the maximum available voltage Vsmax and the feedback voltage Vs. In other words, the remaining available voltage Vr represents a portion of the maximum available voltage Vsmax the inverter 1 is not using and still has available in real-time.

The remaining available voltage Vr is provided to a multiplier 43 that outputs the pre-limited flux weakening reference current PreRef_Id by multiplying the remaining available voltage Vr with a flux weakening current ratio FW_Id_ratio. The flux weakening current ratio FW_Id_ratio is a programmable negative value that defines a spread of a flux weakening region. Thus, the FW_Id_ratio provides the ability to adjust the spread of flux weakening region. Ratio generator 44 is configured to output the flux weakening current ratio FW_Id_ratio based on a programmable field weakening Id limit value $ID_{FW\_LIMIT}$, a SVPWM maximum voltage limit $V_{DC}/\sqrt{3}$, where $V_{DC}$ is the supply voltage to the inverter 1, and a maximum quadrature-axis voltage Vqmax. Each term used by the ratio generator 44 is configurable and predetermined. Thus, the flux weakening current ratio FW_Id_ratio itself is predetermined. The ratio generator 44 may be a processor that calculates and outputs the flux weakening current ratio FW_Id_ratio based on the input parameters $ID_{FW\_LIMIT}$, Vqmax, and $V_{DC}/\sqrt{3}$ the provided equation $ID_{FW\_LIMIT}/(Vqmax-V_{DC}/\sqrt{3})$.

In voltage control mode, the reference quadrature-axis motor voltage Vqref controls the applied voltage to the motor for torque generation. Typically, Vqref is limited to $V_{DC}/\sqrt{3}$ as a maximum limit to the SVPWM module 39 in the linear region. However, in the motor control algorithm 200, Vqref is allowed to be higher than $V_{DC}/\sqrt{3}$ and the range above the SVPWM limit $V_{DC}/\sqrt{3}$ is used to define the spread of flux weakening region. The maximum Vq reference is denoted by Vqmax. When Vqref crosses $V_{DC}/\sqrt{3}$ the flux weakening will be activated by the multiplier 43 by generating the pre-limited flux weakening reference current PreRef_Id as a negative value.

An adjustable current limiter 40 includes a limiter 45, a current limit value calculation unit 46, and a low-pass filter (LPF) 47. The limiter 45 is configured to receive the pre-limited flux weakening reference current PreRef_Id from the multiplier 43 and the current limit value $I_{Lim}$ from the current limit value calculation unit 46 and output the flux weakening reference current Ref_Id based on the two inputs. The current limit value $I_{Lim}$ is a variable limit set at the limiter 45 that varies between zero and a predetermined negative flux weakening current limit based on the function $I_{Lim}=MAX((-Sqrt(Ismax^2-Iq^2)),Id\_FW\_LIMIT)$, where Ismax is the maximum current the inverter 1 can supply. The predetermined negative flux weakening current limit is the maximum value permitted by the function that occurs when Iq is zero. The value of Ismax is a configurable or—hardware limit. Thus, Ismax is preconfigured (i.e., fixed). The current limit value calculation unit 46 is a processor that receives the quadrature-axis current Iq from the vector rotation unit 22 and calculates the current limit value $I_{Lim}$ accordingly. The limiter 45 adjusts its The current limit value $I_{Lim}$ is a negative value when non-zero. When both the pre-limited flux weakening reference current PreRef_Id and the current limit value $I_{Lim}$ are non-zero, the flux weakening reference current Ref_Id is set to a negative value and, as a result, flux weakening is activated. The pre-limited flux weakening reference current PreRef_Id is a negative value when the remaining available voltage Vr is non-zero. Thus, flux weaking is possible as long as the demand voltage Vs has not reached the limit of the maximum available voltage Vsmax. The flux weakening causes a flux linkage of the PMSM to weaken and thereby causes the motor speed to increase. The greater the amount of flux weakening leads to higher maximum motor speeds above the base speed. Without flux weakening, the maximum motor speed is limited to the base speed.

The flux weakening control loop 14 is configured to dynamically adjust the flux weakening reference current Ref_Id within a range defined by zero and the current limit value $I_{LIM}$ based on changes to the motor load. If the pre-limited flux weakening reference current PreRef_Id is equal to or less than the current limit value $I_{LIM}$, the limiter 45 will pass the pre-limited flux weakening reference current PreRef_Id through to the LPF 47 as the flux weakening reference current Ref_Id. In contrast, if the pre-limited flux weakening reference current PreRef_Id is greater than the current limit value $I_{LIM}$, the limiter 45 will limit the pre-limited flux weakening reference current PreRef_Id to the current limit value $I_{LIM}$, and the flux weakening reference current Ref_Id will be equal to the current limit value $I_{LIM}$.

As noted above, the current limit value $I_{LIM}$ is a variable limit that varies between zero and a predetermined negative flux weakening current limit. The limiter 45 is configured to shift the flux weakening reference current towards zero as the motor load increases (i.e., as Iq increases) and shift the flux weakening reference current away from zero as the motor load decreases (i.e., as Iq decreases) due to the change in the current limit value $I_{LIM}$. Said differently, the flux weakening controller 14 is configured to dynamically increase a motor torque and dynamically decrease a motor speed by shifting the current limit value $I_{LIM}$ towards zero (i.e., making $I_{LIM}$ less negative or zero) as the motor load increases and the flux weakening controller 14 is configured to dynamically decrease the motor torque and dynamically increase the motor speed by shifting the current limit value $I_{LIM}$ away from zero (i.e., making $I_{LIM}$ more negative) as the motor load decreases.

The current limit value calculation unit 46 is configured to receive the quadrature-axis motor current Iq and dynamically adjust the current limit value $I_{LIM}$ of the limiter 45 based on changes to the quadrature-axis motor current Iq. Specifically, the current limit value calculation unit 46 calculates the current limit value $I_{LIM}$ based on the square root (Sqrt) of (Ismax$^2$–Iq$^2$)·(–1), where Ismax denotes an inverter supply current. According to the applied function, the current limit value $I_{LIM}$ is equal to the predetermined negative flux weakening current limit when the quadrature-axis motor current Iq is zero and the current limit value $I_{LIM}$ is equal to zero when the quadrature-axis motor current Iq is equal to the inverter supply current Ismax.

As a result, the current limit value calculation unit 46 is configured to shift the current limit value $I_{Lim}$ towards zero, thereby making the magnitude of $I_{LIM}$ smaller and less negative, as the quadrature-axis motor current Iq increases (i.e., as load and required torque increase). This results in a smaller limit being applied to the pre-limited flux weakening reference current PreRef_Id by limiter 45, which causes the flux weakening reference current Ref_Id to be restricted to a smaller value, thereby restricting the motor speed to smaller speeds.

On the other hand, the current limit value calculation unit 46 is configured shift the current limit value $I_{LIM}$ away from zero, thereby making the magnitude of $I_{LIM}$ larger and more negative, as the quadrature-axis motor current decreases (i.e., as load and required torque decrease). This results in a larger limit being applied to the pre-limited flux weakening reference current PreRef_Id by limiter 45, which causes the flux weakening reference current Ref_Id to be restricted to a larger value, thereby enabling larger motor speeds.

The current limit value calculation unit 46 is configured to deactivate flux weakening by setting the current limit value $I_{LIM}$ to zero on a condition that the quadrature-axis motor current Iq is equal to a predefined maximum current defined by the inverter supply current Ismax. When the current limit value Lim is set to zero, the limiter 45 sets the flux weakening reference current to zero, thereby resulting in no flux weakening being produced by the flux weakening controller 14. Accordingly, the limiter 45 limits the pre-limited flux weakening reference current PreRef_Id to a negative value not exceeding the current limit value $I_{LIM}$ to generate the flux weakening reference current Ref_Id.

The LPF 47 receives the flux weakening reference current Ref_Id and filters out unwanted frequency components, such as high frequency noise, from the flux weakening reference current Ref_Id before providing the flux weakening reference current Ref_Id to the error generator 32.

The flux weakening controller 14 also includes a Vq voltage limiter 50 that receives a reference quadrature-axis motor voltage Vqref and outputs the quadrature-axis motor voltage Vq based on the reference quadrature-axis motor voltage Vqref and a variable Vq limit value $V_{LIM}$. The Vq voltage limiter 50 includes a limiter 51, a Vq limit value calculation unit 52, and an LPF 53. The limiter 51 is configured to receive the reference quadrature-axis motor voltage Vqref from a programmable voltage source and the variable Vq limit value $V_{LIM}$ from the Vq limit value calculation unit 52 and output the quadrature-axis motor voltage Vq based on the two inputs. The reference quadrature-axis motor voltage Vqref is a programmable value and is therefore preconfigured (i.e., fixed). It is also noted that the variable Vq limit value $V_{LIM}$ is a positive value when it deviates from zero. Thus, the quadrature-axis motor voltage Vq can vary from zero to the variable Vq limit value $V_{LIM}$ depending on the reference quadrature-axis motor voltage Vqref and the variable Vq limit value $V_{LIM}$.

The Vq limit value calculation unit 52 is a processor that receives the direct-axis voltage Vd from the Id PI controller 34 and calculates the variable Vq limit value $V_{LIM}$ according to equation: $V_{LIM}$=Sqrt(Vsmax$^2$–Vd$^2$). Accordingly, Vq limit value calculation unit 52 is configured to receive the direct-axis motor voltage Vd, calculate the variable Vq limit value $V_{LIM}$ based on the direct-axis motor voltage Vd in real-time, and dynamically limits the quadrature-axis motor voltage Vq according to the voltage limit value $V_{LIM}$, where the voltage limit value $V_{LIM}$ is a variable limit that varies between zero and a predetermined positive voltage limit. The predetermined positive voltage limit is a maximum value from the voltage limit equation that occurs when the direct-axis motor voltage Vd is zero. Specifically, the predetermined positive voltage limit is equal to the maximum available voltage Vsmax (i.e., the inverter supply voltage). Thus, the variable Vq limit value $V_{LIM}$ is equal to the predetermined positive voltage limit (Vsmax) when the direct-axis motor voltage is zero and the variable Vq limit value $V_{LIM}$ is equal to zero when the direct-axis motor voltage Vd is equal to the inverter supply voltage Vsmax.

The Vq limit value calculation unit 52 is configured to adjust the variable Vq limit value $V_{LIM}$ based on the direct-axis motor voltage Vd such that the variable Vq limit value $V_{LIM}$ is shifted towards zero (i.e., becomes less positive) as the direct-axis motor voltage Vd increases and is shifted towards the predetermined positive voltage limit (i.e., becomes more positive) as the direct-axis motor voltage Vd decreases. The Vq limit value calculation unit 52 decreases the variable Vq limit value $V_{LIM}$ as a magnitude of the direct-axis motor voltage Vd and a magnitude of the flux weakening reference current Ref_Id increase. The Vq limit value calculation unit 52 increases the variable Vq limit value $V_{LIM}$ as the magnitude of the direct-axis motor voltage Vq and the magnitude of the flux weakening reference current decrease Ref_Id. The variable Vq limit value $V_{LIM}$ is set to zero when the direct-axis motor voltage Vd is equal to a maximum available voltage Vsmax, thereby limiting the quadrature-axis motor voltage Vq to zero.

In summary, the Vq limit value calculation unit 52 receives the reference quadrature-axis motor voltage Vqref and the direct-axis motor voltage Vd and dynamically adjusts a variable Vq limit value $V_{LIM}$ according to the voltage limit equation. The Vq limit value calculation unit 52 provides the variable Vq limit value $V_{LIM}$ to the LPF 53, which removes unwanted frequency components, such as noise, from the signal providing the variable Vq limit value $V_{LIM}$. The LPF 53 then provides the variable Vq limit value $V_{LIM}$ to the limiter 51.

The limiter 51 receives the variable Vq limit value $V_{LIM}$ and sets its limit to the variable Vq limit value $V_{LIM}$. The limiter 51 also receives the reference quadrature-axis motor voltage Vqref. The limiter 51 outputs the reference quadrature-axis motor voltage Vqref as the quadrature-axis motor voltage Vq when the reference quadrature-axis motor voltage is equal to or less than the variable Vq limit value $V_{LIM}$. In contrast, the limiter 51 limits the reference quadrature-axis motor voltage Vqref to the variable Vq limit value $V_{LIM}$ when the reference quadrature-axis motor voltage Vqref is greater than the variable Vq limit value $V_{LIM}$ and outputs the limited reference quadrature-axis motor voltage as the quadrature-axis motor voltage Vq.

In view of the above, the flux weakening reference current Ref_Id is controlled based upon the following factors. First, it is limited by the maximum current allowed Ismax. Second, it is limited by the pre-limited flux current weakening reference generated based on, and thus, limited by, the reference quadrature-axis motor voltage Vqref and the flux weakening current ratio FW_Id_ratio in accordance with the feedback path of the flux weakening control loop 14.

By doing dynamic adjustment to the flux weakening reference current Ref_Id, the flux weakening is adapted in real-time with the load change. While operating in flux weakening, if the motor load is increased, then flux weakening reference current Ref_Id shifts towards zero. The motor controller 6 makes use of the inverter's maximum current capability Ismax for generating higher torque with lower motor speed. When the motor has lightly loaded, the inverter's current capability Ismax is utilized to deliver maximum speed with lower torque. This dynamic transition makes it possible for the motor controller 6 to utilize the inverter's maximum current capability Ismax to achieve higher speed or higher torque or a combination of both based on real-time load demands.

One or more of the following advantages may also be realized: load adaptive flux weakening provides seamless switching between high speed and high torque, there is no complex PI control tuning required for the flux weakening controller, improved control over the load torque and high speed without complex control; maximum utilization of inverter current for high speed, high torque, or a combination of both, speed/torque control is not necessary and can be implemented with simple voltage control, and no LUT makes it possible to implement it on a low-end microcontroller.

The flux weakening method is implemented with voltage control. Vqref is allowed to go higher than the SVPWM limit and the excess Vqref is used to determine the flux weakening reference current. This way one can vary the flux reference current linearly with the Vqref and limited as per the FW_Id_ratio.

To perform load adaptive flux weakening, the inverter maximum current capability Ismax is considered. PreRef_Id is generated by the FW_Id_ratio and limited by limiter 45. Limit $I_{LIM}$ is calculated dynamically considering maximum inverter current Ismax and torque current Iq. Torque current Iq is given more priority than the flux current Id. Under high load, the motor control algorithm 200 will deliver maximum torque, whereas under light load conditions the motor control algorithm 200 will deliver the higher speed. Seamless transition between high torque and high speed makes it suitable even for applications where a high dynamic load change response is required. The motor control algorithm 200 is also capable of delivering maximum speed under medium load conditions by making proper allocation of the maximum inverter current Ismax into torque generation and flux weakening.

While various embodiments have been described, it will be apparent to those of ordinary skill in the art that many more embodiments and implementations are possible within the scope of the disclosure. For example, while certain embodiments may be directed to sensorless FOC, the embodiments may also use sensor-based FOC as long as the rotor position estimator 23 is active. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A motor drive system configured to drive a permanent magnet synchronous motor (PMSM) with Field Oriented Control (FOC), the motor drive system comprising:
   a current controller configured to generate control signals for driving motor currents of the PMSM according to a motor load, wherein the current controller is configured to receive current information of the PMSM, including a direct-axis motor current and a quadrature-axis motor current,
      wherein the current controller comprises a direct-axis current controller configured to receive a flux weakening reference current and the direct-axis motor current to generate a direct-axis error value based on a difference between the flux weakening reference current and the direct-axis motor current,
         wherein the direct-axis current controller is configured to regulate a direct-axis motor voltage, wherein the direct-axis current controller generates the direct-axis motor voltage based on the direct-axis error value, and
      wherein the current controller comprises a flux weakening controller configured to generate and dynamically adapt the flux weakening reference current based on changes to the motor load; and
   a Vq voltage limiter configured to receive the direct-axis motor voltage, calculate a voltage limit value based on the direct-axis motor voltage in real-time, and dynamically limit a quadrature-axis motor voltage according to the voltage limit value, wherein the voltage limit value is a variable limit that varies between zero and a predetermined positive voltage limit.

2. The motor drive system of claim 1, wherein flux weakening controller is configured to set the flux weakening reference current to a negative value in order to activate flux weakening that causes a flux linkage of the PMSM to weaken.

3. The motor drive system of claim 1, wherein the flux weakening controller is configured to dynamically adjust the flux weakening reference current within a range defined by zero and a current limit value based on changes to the motor load, wherein the current limit value is a variable limit that varies between zero and a predetermined negative flux weakening current limit.

4. The motor drive system of claim 3, wherein the flux weakening controller is configured to shift the flux weakening reference current towards zero as the motor load increases and shift the flux weakening reference current away from zero as the motor load decreases.

5. The motor drive system of claim 3, wherein the flux weakening controller is configured to dynamically increase a motor torque and dynamically decrease a motor speed by shifting the current limit value towards zero as the motor load increases and the flux weakening controller is configured to dynamically decrease the motor torque and dynamically increase the motor speed by shifting the current limit value away from zero as the motor load decreases.

6. The motor drive system of claim 3, wherein the flux weakening controller is configured to receive the quadrature-axis motor current and dynamically adjust the current limit value based on changes to the quadrature-axis motor current.

7. The motor drive system of claim 6, wherein flux weakening controller is configured to dynamically adjust the current limit value according based on $Ismax^2 - Iq^2$, wherein Ismax denotes an inverter supply current and Iq denotes the quadrature-axis motor current, wherein the current limit value is equal to the predetermined negative flux weakening current limit when the quadrature-axis motor current is zero and the current limit value is equal to zero when the quadrature-axis motor current is equal to the inverter supply current.

8. The motor drive system of claim 6, wherein the flux weakening controller is configured to dynamically adjust the current limit value based on a difference between a predefined maximum current and the quadrature-axis motor current.

9. The motor drive system of claim 6, the flux weakening controller is configured to shift the current limit value towards zero as the quadrature-axis motor current increases and shift the current limit value away from zero as the quadrature-axis motor current decreases.

10. The motor drive system of claim 6, the flux weakening controller is configured to deactivate flux weakening by setting the flux weakening reference current to zero on a condition that the quadrature-axis motor current is equal to a predefined maximum current.

11. The motor drive system of claim 10, wherein the Vq voltage limiter is configured to receive a reference quadrature-axis motor voltage and output the quadrature-axis motor voltage based on the reference quadrature-axis motor voltage and the voltage limit value.

12. The motor drive system of claim 3, wherein the flux weakening controller includes:
   a feedback path configured to extract the direct-axis motor voltage, wherein the flux weakening controller is configured to calculate a pre-limited flux weakening reference current based on the direct-axis motor voltage and a reference quadrature-axis motor voltage; and
   an adjustable current limiter configured to receive the pre-limited flux weakening reference current and limit the pre-limited flux weakening reference current to a negative value not exceeding the current limit value to generate the flux weakening reference current.

13. The motor drive system of claim 12, the adjustable current limiter is configured to set the current limit value to zero on a condition that the quadrature-axis motor current is equal to a predefined maximum current, thereby setting the flux weakening reference current to zero.

14. The motor drive system of claim 12, wherein the flux weakening controller is configured to:

calculate a feedback voltage as a square root of ($Vd^2+Vqref^2$), where Vd denotes the direct-axis motor voltage and Vqref denotes the reference quadrature-axis motor voltage, calculate a remaining available voltage by subtracting the feedback voltage from a maximum available voltage, and calculate the pre-limited flux weakening reference current based on the remaining available voltage.

15. The motor drive system of claim 14, wherein the flux weakening controller is configured to calculate the pre-limited flux weakening reference current by multiplying the remaining available voltage by a predetermined flux weakening ratio that defines a spread of a flux weakening region.

16. The motor drive system of claim 1, wherein the Vq voltage limiter is configured to calculate the voltage limit value based on $Vsmax^2-Vd^2$, wherein Vsmax denotes an inverter supply voltage and Vd denotes the direct-axis motor voltage, wherein the voltage limit value is equal to the predetermined positive voltage limit when the direct-axis motor voltage is zero and the voltage limit value is equal to zero when the direct-axis motor voltage is equal to the inverter supply voltage.

17. The motor drive system of claim 1, wherein the Vq voltage limiter is configured to adjust the voltage limit value based on the direct-axis motor voltage such that the voltage limit value is shifted towards zero as the direct-axis motor voltage increases and is shifted towards the predetermined positive voltage limit as the direct-axis motor voltage decreases.

18. The motor drive system of claim 1, wherein the Vq voltage limiter is further configured to:
receive a reference quadrature-axis motor voltage and the direct-axis motor voltage,
dynamically adjust a voltage limit value based on the direct-axis motor voltage, wherein the voltage limit value is positive when it deviates from zero,
output the reference quadrature-axis motor voltage as the quadrature-axis motor voltage on a condition that the reference quadrature-axis motor voltage is equal to or less than the voltage limit value, and
limit the reference quadrature-axis motor voltage to the voltage limit value on a condition that the reference quadrature-axis motor voltage is greater than the voltage limit value and output the limited reference quadrature-axis motor voltage as the quadrature-axis motor voltage.

19. The motor drive system of claim 18, wherein the Vq voltage limiter is configured to decrease the voltage limit value as a magnitude of the direct-axis motor voltage and a magnitude of the flux weakening reference current increase and a voltage regulator is configured to increase the voltage limit value as the magnitude of the direct-axis motor voltage and the magnitude of the flux weakening reference current decrease.

20. The motor drive system of claim 18, wherein the Vq voltage limiter is configured to set the voltage limit value to zero on a condition that the direct-axis motor voltage is equal to a maximum available voltage, thereby limiting the quadrature-axis motor voltage to zero.

21. A method of driving a permanent magnet synchronous motor (PMSM) with Field Oriented Control (FOC), the method comprising:
generating, by a current controller, control signals for driving motor currents of the PMSM;
measuring, by the current controller, current information of the PMSM, including a direct-axis motor current and a quadrature-axis motor current;
generating, by a direct-axis current controller, a direct-axis error value based on a difference between a flux weakening reference current and the direct-axis motor current;
regulating, by the direct-axis current controller, a direct-axis motor voltage, including generating the direct-axis motor voltage based on the direct-axis error value;
dynamically limiting, by a Vq voltage limiter, a quadrature-axis motor voltage according to a voltage limit value, wherein the voltage limit value is calculated based on the direct-axis motor voltage in real-time, and wherein the voltage limit value is a variable limit that varies between zero and a predetermined positive voltage limit; and
generating and dynamically adapting, by a flux weakening controller, the flux weakening reference current based on changes to a motor load.

22. The method of claim 21, further comprising:
setting the flux weakening reference current to a negative value in order to activate flux weakening that causes a flux linkage of the PMSM to weaken.

* * * * *